Figure 1:
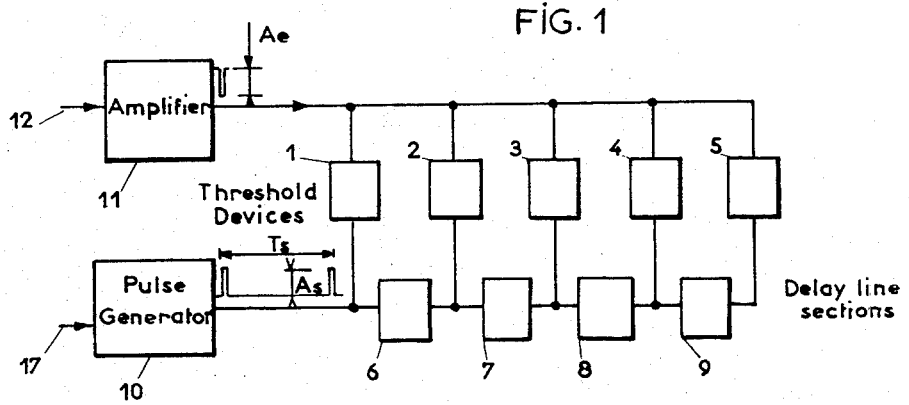

Inventor
Jacques Dory
By Michael S. Striker
Attorney

United States Patent Office 2,995,926
Patented Aug. 15, 1961

2,995,926
ELECTRIC SIGNALS DISPLAY DEVICE
Jacques Dory, Paris, France, assignor to Societe "Realisations Ultrasoniques," a corporation of France
Filed May 3, 1956, Ser. No. 582,493
Claims priority, application France May 10, 1955
2 Claims. (Cl. 73—67.8)

This invention relates to an electric signal display or detecting device which can be used, for example, for displaying or detecting echo signals obtained in systems for testing metal pieces by means of ultrasonic pulses.

In conventional systems of this type such echoes are generally displayed on the screen of a cathode ray tube. This method presents under certain conditions various drawbacks. In particular, cathode ray tubes generally require high supply voltages which may be inconvenient in the case of portable test devices where power supply is derived from electric cells or storage batteries.

An object of the invention is to provide a display or detecting device free from this drawback.

Another object of the invention is to provide an apparatus for testing solid bodies by means of elastic pulses, which is provided with such an echo display or detecting device.

The echo display or detecting device according to the invention includes a plurality of threshold devices, each of which has a first and a second pole and changes its state in a manner identifiable by the operator when a voltage higher than a given level is applied between its poles; a delay line comprising the same number of delay units arranged in series and provided with taps to which said first pores are connected; means for applying to the input end of said delay line sensitizing or prepriming recurring pulses, the amplitude of which is less than said level, the recurring period of these pulses is preferably at least equal to the sum of delays brought by the delay units, and the duration of which is at least equal to their propagation time through one delay unit; and means for applying to said second poles the echoes to be displayed or detected, said echoes being amplified to make the difference of potential across the two-pole threshold devices for which an echo and one of said pulses are coincident, higher than said level.

According to an embodiment of the invention said two-pole threshold devices are gas discharge tubes, said level being their firing voltage.

According to a particular embodiment, said two-pole threshold devices are neon tubes having a given firing voltage and an extinction voltage lower than said firing voltage, the device further comprising means for applying to the input of the delay line a direct-current bias voltage lower than said firing voltage but higher than said extinction voltage, the amplitude of said pulses and the amplitude of said echoes being lower than said extinction voltage, but sufficient to cause firing of the neon tubes across the terminals of which a pulse and an echo are simultaneously applied, and means to apply to the input of the delay line extinction pulses of the same recurring period as the sensitizing pulses.

Figure 2:
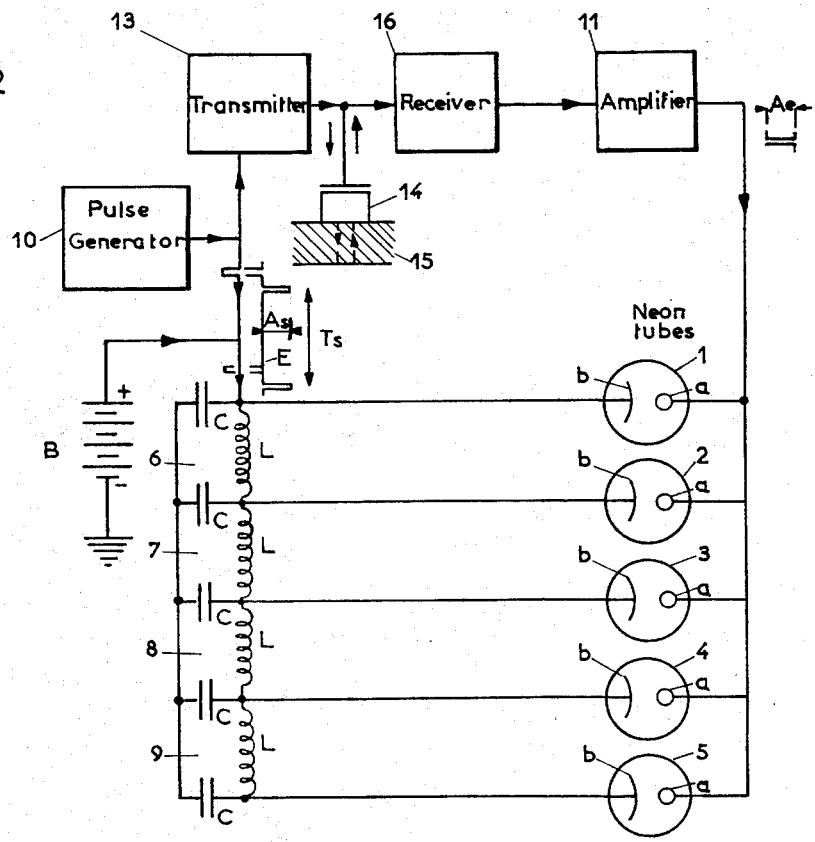

The invention will be more clearly understood from the following description, and the appended drawings in which:

FIG. 1 is a block diagram of an electric echo display or detecting device according to the invention; and FIG. 2 is a circuit diagram of a particular embodiment of the invention applied to an ultrasonic testing apparatus.

IN FIGURE 1, reference numbers, 1, 2, 3, 4, 5 are two-pole threshold devices; 6, 7, 8, 9 the corresponding delay line sections or units; 10 is a device for generating sensitizing or pre-priming pulses, the function of which will be explained hereinafter; 11 is an amplifier device for adjusting the amplitude or the echo signals, applied to the input 12 of the device.

In FIGURE 2 the same references designate the same parts as in FIGURE 1, the two-pole threshold devices being neon tubes 1 to 5, each of which has two electrodes $a$ and $b$. Each of the delay line units or sections consists of a conventional delay circuit including a parallel-combination of an inductance coil L and at least one condenser C. The sensitizing or pre-priming pulse generator 10 is in the embodiment of FIG. 2 the synchronizing generator of ultrasonic pulses of an apparatus for testing solid bodies by means of such pulses. Such apparatus comprises a transmitter 13, a piezo-electric transducer 14, which is applied to the part to be examined 15, and a receiver 16 for receiving the echoes of ultrasonic pulses. Receiver 16 is connected to amplifier 11 which is coupled in the same manner as in FIG. 1.

The number of neon tubes is selected in accordance with the fixed requirements and the number illustrated in the drawing is of course not limitative. The operation of the system shown in the drawing will be described under certain operative conditions, given by way of a non limitative example.

It will be assumed that the input signals to be displayed or detected are the recurring echoes reflected from the bottom of part 15, or boundary echoes of ultrasonic pulses, the recurrence period of which is $Ts=1000$ $\mu s$; the recurrence period of the echoes due to the reflection of these pulses is also 1000 $\mu s$. The first echo is delayed, for example by 42 $\mu s$, for instance with respect to the corresponding pulse, this time interval being the time necessary for the ultrasonic pulse to reach the bottom of part 15 and be reflected therefrom. The second echo is delayed by $42\times2=84$ $\mu s$. with respect to said pulse, the third echo by 126 $\mu s$. It will be assumed that, in the particular example described, the amplitude of echoes beyond the third echo is too low to be detected.

A generator 10, which in the case of FIGURE 1 may be any device generating recurring pulses, provided pulses which are used as marking pulses, the marking pulses having the same recurrence period as the echoes and occurring between the echoes. In the particular embodiment of FIGURE 2, generator 10 is the synchronizing generator of transmitter 13; such synchronizing generators are generally available in ultrasonic depth measuring equipments, radars, radioelectric pulse altimeters, etc.

Broadly, each time it is desired to display or detect recurring signals by means of the device according to the invention, it is sufficient to have at one's disposal a synchronizing generator 10 which generates pulses having the same recurrence period as said signals. The function of these pulses of amplitude $As$ is to sensitize or pre-prime in turn each of neon tubes 1, 2, 3 etc. by applying a difference of potential across its electrodes. In FIG. 1 it may be, for example, assumed that $As=50$ v. while the neon tube firing voltage is 70 v. It will then suffice that an echo having an amplitude of at least 20 volts is applied with a suitable polarity to electrode $a$ of one of said tubes together with a pre-priming pulse for the tube to fire. Echoes will be assumed to be amplified up to an amplitude of, for example, 30 volts by amplifier 11. If a pulse is emitted, at a moment taken as time origin by generator 10, and if this pulse has a duration of 30 $\mu s$. and its time of propagation through each section 6, 7, etc., of the delay line is also 30 $\mu s$., this pulse will sensitize or pre-prime neon tube 1 during 30 $\mu s$. after the origin of time (travelling time between 10 and 1 may be disregarded), it will sensitize tube 2 during the time interval comprised between 30 $\mu s$. and 60 $\mu s$. after the origin of time and so on, tube 5 being sensitized or pre-primed between 120 and 150 $\mu s$. after the origin of time, Thus it can be seen that, provided the synchronizing pulse duration is at least equal to the delay caused by one section of the delay line, at least one among tubes 1, 2, 3, 4, and 5 is sensitized or pre-timed at the time of occurrence of the first, second and third echoes above mentioned.

In the example described the first echo will be detected or manifested by tube 2, the second by tube 3 and the third by tube 5 as they occur 42 µs., 84 µs., 126 µs., after zero time, respectively. Of course it would be possible, through a suitable adjustment of Ae, the amplitude of the echo pulses, to cause only the first echo, which would be the only one to have an amplitude higher than 20 v., to be manifested.

This possibility is of particular interest in the case of thickness measuring devices which use ultrasonic pulses. It would also be possible to adjust the amplification of device 11 in such a manner that only echoes above a given level are displayed, which may be useful in the detection of flaws in solid bodies.

Of course the synchronizing pulses will also be detected by tube 1, provided they are kept in the signal applied to electrodes a. A simple manner of eliminating the synchronizing pulses is to suppress tube 1.

The embodiment of FIGURE 2 will be preferred if elements 1, 2, etc. are neon tubes: indeed, if it is assumed that their firing voltage is 70 volts while their extinction voltage is 55 volts, in the case of FIGURE 1, the illuminated tube is extinguished as soon as the coincidence between the sensitizing pulse and the echo is ended.

On the other hand, in the embodiment of FIGURE 2, electrodes b may be submitted to a direct positive biasing voltage of 60 v. for instance, the amplitude of sensitizing pulses being adjusted to +1 volts for instance; it is then sufficient that the echo amplitude is at least equal of 3 volts (with negative polarity) to light the neon tube corresponding to the coincidence. It will remain illuminated until the following recurrence period. A negative extinguishing pulse, having an amplitude E of for example 50 volts and generated by device 10, a short time before the sensitizing pulse As, is then used to extinguish the tubes fired by the coincidences of the echo and of the sensitizing pulse. Under these conditions the duration of illumination of the tubes is longer than in the case of the device of FIGURE 1.

Of course the invention is not limited to the embodiments described, many modifications in so far as the type of delay line, the threshold devices (which could be, for example, cold cathode thyratrons allowing the control of a recording device), and the combination of signals causing the tubes to fire being within the reach of those skilled in the art, without departing from the spirit and scope of the invention.

Having thus described my invention, what I claim as new and desire to secure by Letters Patent of the United States is:

1. In a sounding device having primary means for producing signal pulses and for transmitting said pulses into a medium capable of reflecting the same in the form of a series of echo pulses, and receiver means adapted to receive said echo pulses, an indicator device for indicating the sequence and time-spacing of said echo pulses, comprising in combination, amplifier means connected with said receiver means for amplifying said echo pulses to a predetermined voltage amplitude; generator means operatively connected with said primary means for producing, synchronously with said signal pulses, timing pulses of predeterminable duration and time-spacing and adjustable to a predetermined voltage amplitude; delay line means comprising a plurality of series-connected line sections each including a parallel-combination of inductance means and capacitor means, the input end of said delay line means being connected to the output of said generator means for receiving said timing pulses and for causing a predetermined delay of the passage thereof through each of said delay line sections; a series of signal-producing gas-discharge tube means each having a first and a second electrode and characteristic igniting and cut-off potentials, said gas-discharge tube means being connected sequentially in parallel with each other between the output of said amplifier means and said delay line means, all of said second electrodes being connected to said output of said amplifier means, the first electrodes, respectively, of the first and last one of said series of gas-discharge tubes being connected to the input end and the output end of said delay line means respectively, while the junction points between said series-connected line sections are sequentially connected to the first electrodes of the other ones of said gas-discharge tube means, respectively, the voltage amplitude of said timing pulses being adjusted to be below said characteristic igniting potential of said gas-discharge tube means, the time-spacing of said timing pulses being predetermined to be at least equal to the sum of the individual delays caused by said series-connected delay line sections, and the duration of each of said timing pulses being predetermined to be at least equal to their propagation time through each one of said delay line sections, the voltage amplitude of said echo pulses appearing at the output of said amplifier means and reaching said second electrodes of said gas-discharge tube means being predetermined to be such that, whenever an echo pulse reaches any one of said second electrodes coincidentally with one of said timing pulses reaching said first electrodes from said delay line means, the potential between said first and second electrodes in at least one of said gas-discharge tube means is raised above said characteristic igniting potential thereof, in such a manner that the thus caused ignition of a particular one of said series of gas-discharge tube means is an indication of the time-spacing between one of said signal pulses and the ensuing echo pulses.

2. In a sounding device having primary means for producing signal pulses and for transmitting said pulses into a medium capable of reflecting the same in the form of a series of echo pulses, and receiver means adapted to receive said echo pulses, an indicator device for indicating the sequence and time-spacing of said echo pulses, comprising in combination, amplifier means connected with said receiver means for amplifying said echo pulses to a predetermined voltage amplitude; generator means operatively connected with said primary means for producing, synchronously with said signal pulses, timing pulses, of predeterminable duration and time-spacing and adjustable to a predetermined voltage amplitude; delay line means comprising a plurality of series-connected line sections each including a parallel-combination of inductance means and capacitor means, the input end of said delay line means being connected to the output of said generator means for receiving said timing pulses and for causing a predetermined delay of the passage thereof through each of said delay line sections; a series of signal-producing neon tube means each having a first and a second electrode and characteristic igniting and cut-off potentials, said neon tube means being connected sequentially in parallel with each other between the output of said amplifier means and said delay line means, all of said second electrodes being connected to said output of said amplifier means, the first electrodes, respectively, of the first and last one of said series of neon tubes being connected to the input end and the output end of said delay line means, respectively, while the junction points between said series-connected line sections are sequentially connected to the first electrodes of the other ones of said neon tube means, respectively, the voltage amplitude of said timing pulses being adjusted to be below said characteristic igniting potential of said neon tube means, the time-spacing of said timing pulses being predetermined to be at least equal to the sum of the individual delays caused by said series-connected delay line sections, and the duration of each of said timing pulses being predetermined to be at least equal to their propagation time through each one of said delay line sections, the voltage amplitude of said echo pulses appearing at the output of said amplifier means and reaching said second electrodes of said neon tube means being predetermined to be such that, whenever an echo pulse reaches any one of said second electrodes coincidentally with one of said timing pulses reaching said first electrodes from said delay line means, the potential between said first and second electrodes in at least one of said neon tube means is raised above said characteristic igniting potential thereof, in such a manner that the thus caused ignition of a particular one of said series of neon tube means is an indication of the time-spacing between one of said signal pulses and the ensuing echo pulses.

References Cited in the file of this patent

UNITED STATES PATENTS

| | | |
|---|---|---|
| 2,252,189 | Langer | Aug. 12, 1941 |
| 2,365,567 | Langer | Dec. 19, 1944 |
| 2,728,030 | Green | Dec. 30, 1955 |
| 2,796,531 | Brasch | June 18, 1957 |
| 2,818,531 | Peek | Dec. 31, 1957 |